Sept. 13, 1960
A. G. FOX
2,952,821
PHASE SHIFTER
Filed July 6, 1955
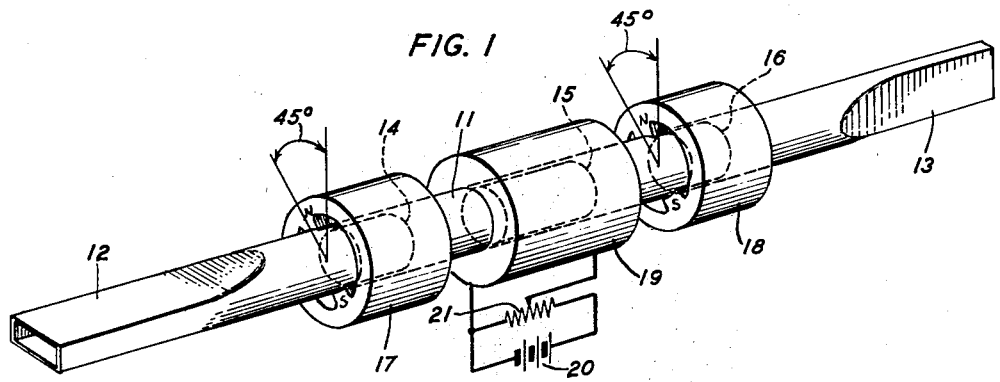
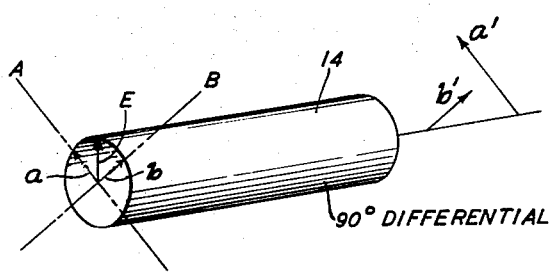
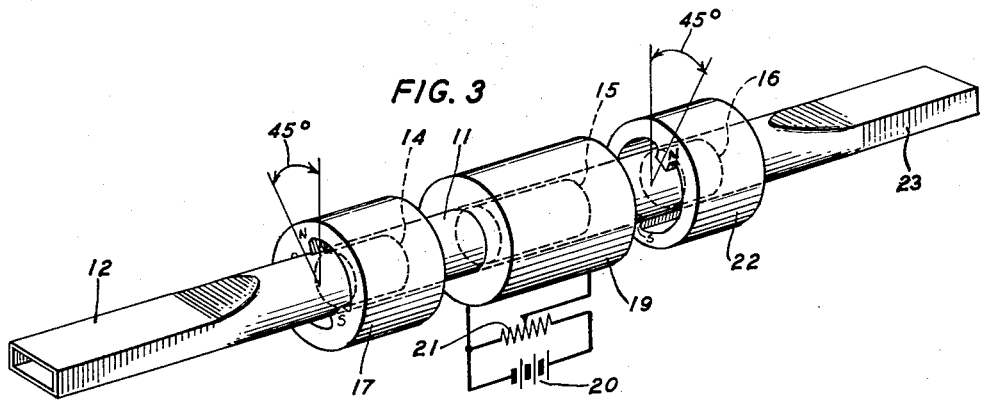
INVENTOR
A. G. FOX
BY
ATTORNEY United States Patent Office 2,952,821
Patented Sept. 13, 1960

2,952,821

PHASE SHIFTER

Arthur G. Fox, Rumson, N.J., assignor to Bell Telephone Laboratories, Incorporated, New York, N.Y., a corporation of New York Filed July 6, 1955, Ser. No. 520,222

2 Claims. (Cl. 333—31)

This invention relates to guided electromagnetic wave transmission systems and, more particularly, to phase changing or phase shifting devices for use in such systems.

This application is a continuation in part of my applications, Serial No. 301,726, filed July 30, 1952, now Patent No. 2,886,785, May 12, 1959, and Serial No. 304,609, filed August 15, 1952, now Patent No. 2,787,765, April 2, 1957.

It is an object of the invention to introduce an easily adjustable value of phase shift which may be either leading or lagging, fixed or continuously variable, to energy conveyed along said systems.

Continuously variable phase changers by means of which the phase of an output wave may be shifted with respect to the input wave are an essential component in the electromagnetic wave transmission art. Such phase changers heretofore have involved mechanically moving parts and were, therefore, inherently restricted to small magnitudes of phase shift and to relatively low speeds of possible variation.

Another object of the invention is to shift the phase of an electromagnetic wave over a range which may exceed one cycle of phase shift by an entirely electrically controlled phase changer.

It is a further object of the invention to vary the value of phase shift introduced at an arbitrarily rapid rate.

In accordance with the invention, the unusual properties of gyromagnetic materials in the presence of exciting magnetic fields are utilized. In the invention, linearly polarized waves are converted to circularly polarized waves, applied to an element of gyromagnetic material which is excited by a longitudinal magnetic field, and then reconverted to linearly polarized waves. A non-reciprocal phase shift is introduced to the wave energy thereby. This resulting instantaneous phase shift depends upon the instantaneous angle of Faraday rotation introduced to the wave energy in its propagation through the gyromagnetic element, which is in turn determined by the strength of the applied magnetic field. The strength of the field is, therefore, electrically controlled to regulate the degree to which the phase of the output wave is shifted.

In one embodiment of the invention, given as an example for purposes of illustration, vertically polarized wave energy entering the phase shifter, exit therefrom horizontally polarized by virtue of the fact that the planes of phase shift of the input and output plane-to-circular polarization converters are parallel to each other. In another embodiment the vertically polarized waves that enter, exit the phase shifter also vertically polarized by virtue of the fact that the input and output converters have mutually perpendicular planes of phase shift.

These and other objects and features of the present invention, the nature of the invention and its advantages, will appear more fully upon consideration of the various specific illustrative embodiments shown in the accompanying drawings and of the following detailed description of these drawings.

In the drawings:

Fig. 1 is a perspective view of a variable phase shifter, in accordance with the invention, for introducing a non-reciprocal variable phase shift to electrical energy traversing therethrough;

Fig. 2 is a schematic representation, given for the purpose of explanation, of a portion of the phase shifter of Fig. 1; and Fig. 3 represents an alternative variation of the phase shifter in Fig. 1, in accordance with the invention.

In Fig. 1 a non-reciprocal gyromagnetic phase shifter is shown for which waves transmitted into one direction through the phase shifter will suffer a phase shift in one sense, which may be either lagging or leading, but waves transmitted in the opposite direction will suffer a phase shift of the opposite sense.

In more detail, the illustrative embodiment of the variable phase shifter in accordance with the invention, comprises a section of wave guide 11, which may be of circular cross section, interposed between suitable transmission means for supporting linearly polarized electromagnetic waves and for applying these waves with a given polarization to guide 11. These transmission means are illustrated in the embodiment of Fig. 1 as sections of rectangular wave guides 12 and 13 whose short sides are mutually perpendicular and which each taper smoothly and gradually into the circular cross section of guide 11 to which they are integrally connected. Rectangular guides 12 and 13 will accept or support only linearly polarized waves in which the electric vector, which determines the plane of polarization of the wave, is parallel to the short side of the rectangular wave guide. The dimensions of guide 11 is preferably chosen so that only the various polarizations of the dominant $TE_{11}$ mode in the circular guide 11 can be propagated. By means of the smooth transition from rectangular guides 12 and 13 to circular guide 11, a $TE_{10}$ mode, in either rectangular guide 12 or 13 may be coupled to and from the $TE_{11}$ mode in circular guide 11 which has a similar or parallel polarization. It is obvious to one skilled in the art that any of a number of other well-known coupling means having polarization-selective transmission characteristics may be employed in lieu of rectangular guides 12 and 13 to couple a linearly polarized wave to the proper polarization in circular guide 11.

Interposed in guide 11 between guides 12 and 13 in the order named are three elements of gyromagnetic material 14, 15 and 16 of the types and having the characteristics to be described. Surrounding guide 11 in the vicinity of elements 14 and 16 are suitable means for producing constant magnetic fields, transverse to the axis of guide 11 and passing through elements 14 and 16 in mutually parallel planes inclined at acute angles of 45 degrees to the respective planes of polarization of wave energy supported in rectangular guides 12 and 13. Since the plane of polarization in guide 12 is vertical, while in guide 13 it is horizontal, it may be seen that the plane of the magnetic field through element 14 is disposed counterclockwise to the vertical polarization in guide 12 when viewed to the right, and the plane of the field through element 16 is disposed counterclockwise to horizontal polarization in guide 13 when viewed to the left. Surrounding guide 11 in the vicinity of element 15 is a means for producing a variable longitudinal magnetic field passing through element 15. As illustrated in Fig. 1, the fields for elements 14 and 16 may be supplied by permanent magnet structures having concentrated pole pieces N and S bearing against the outside wall of guide 11 along narrow, oppositely disposed areas. Thus, the magnetic fields for elements 14 and 16 are supplied by magnet structures 17 and 18, respectively, each having their pole pieces inclined at a fixed 45-degree angle. The longitudinal field for element 15 is provided by solenoid 19 mounted on the outside of guide 11 which is supplied by a variable energizing current from source 20 taken by way of potentiometer 21.

Elements 14, 15 and 16 may each be blocks of gyromagnetic material of the type exhibiting a Faraday-effect rotation when in the presence of a longitudinal magnetizing field. These materials comprise an iron oxide with a quantity of the oxide of nickel, magnesium, zinc, manganese, or other similar material in which the other oxides combine with the iron oxide in a spinel structure. This material is known as ferrite. On the basis of their electrical properties, a particularly suitable designation of this class of materials is "gyromagnetic" to designate materials having electrons capable of being aligned by an external magnetic field and capable of exhibiting the precessional motion of a gyroscopic pendulum. As a specific example, elements 14, 15 and 16 may each be cylindrical blocks of nickel-zinc ferrite prepared in the manner disclosed in the copending application of C. L. Hogan, Serial No. 252,432 filed October 22, 1951, now Patent 2,748,353, May 29, 1956.

Directing attention to elements 14 and 16, it has been determined that when the materials of these elements are excited by a transverse magnetic field, they exhibit a permeability constant of one value to electromagnetic energy components polarized parallel to the exciting magnetic field and a different value to electromagnetic energy components polarized perpendicular to the field. This effect may theoretically be explained by the assumption that the gyromagnetic material contains unpaired electron spins which tend to line up with the applied magnetic field. An electromagnetic wave having its magnetic vector in the direction of the magnetic field (the electric vector perpendicular to the magnetic field) will be unable to reorient the electron spins to any appreciable extent and, hence, will see a permeability close to unity regardless of the strength of the magnetic field. A wave having its magnetic vector at right angles to the magnetic field will cause the electron spins to precess about the axis of the magnetic field in synchronism with the applied electromagnetic wave. Such a wave will see a permeability substantially different from unity because the precessing spins now yield a component of radio frequency flux density along the wave's magnetic vector. The amount of difference from unity will be determined by the strength of the magnetic field.

Since the phase velocity of a wave passing through a material depends upon the permeability of the material, a wave traversing the gyromagnetic material of either elements 14 or 16 with its electric vector polarized parallel to the magnetic field will exhibit a higher phase velocity than the wave polarized perpendicular to the magnetic field. An element having this property, namely, the ability to transmit two sets of waves polarized at right angles to one another with different speeds, will produce two different phase delays for the two polarizations and, accordingly, may be termed a "differential phase shift element." The value of this phase shift difference for a gyromagnetic element is approximately proportional to the thickness of the material traversed by the waves and to the intensity of the magnetization to which the material is subjected. It may be shown by mathematical analysis provided the frequency of the wave energy is substantially greater than the gyromagnetic resonance frequency of the gyromagnetic material, that this phase difference expressed in radians is substantially given by the expression $$\frac{l}{2}\sqrt{\epsilon\mu}\left[\frac{\gamma^2 M^2}{\omega} + \frac{\gamma^2 M H}{\omega}\right]$$

in which $l$ is the thickness of the material in meters, $\epsilon$ is the dielectric constant of the material, $\mu$ is its permeability without exciting magnetic field, $M$ is the saturation magnetization of the material, $H$ is the exciting magnetic field, $\omega$ represents the frequency of the wave energy and $\gamma$ is the spectroscopic splitting factor of the material. In accordance with the invention, the differential phase shifts of elements 14 and 16 are made equal to 90 degrees by properly choosing the thickness of the elements and the strength of the magnetic field applied to each, either by calculations in accordance with the above expression, or by adjustments on an empirical basis.

The effect of 90-degree differential phase shift element 14 located at one end of the phase shift structure is to convert a linearly polarized wave applied to guide 12 into a clockwise rotating circularly polarized wave in guide 11 and may also serve to convert a circularly polarized wave from guide 11 into a linearly polarized wave in guide 12. Element 14 at the opposite end serves a similar purpose. This operation will most readily be understood upon consideration of the schematic representation of Fig. 2 which shows the 90-degree differential phase shift element 14 separated from the other components of Fig. 1.

Referring therefore to Fig. 2, the axis A designates the plane of wave energy of greatest phase velocity, i.e., under the conditions described above, the electric polarization of wave energy parallel to the exciting magnetic field while the axis B designates the plane of wave energy of smaller phase velocity, i.e., the electric polarization of wave energy perpendicular to the exciting magnetic field. This is indicated schematically by showing diametral electric vectors $a$ and $b$ corresponding to adjacent voltage maxima for two waves polarized parallel to the axes A and B, respectively, and entering element 14 from the left at the same instant. These vectors represent two components of a given wave at significant points, and by following the components through phase-shift element 14, the effects upon the wave as a whole may be observed. At the right of element 14 these two vectors are shown emerging displaced from one another, $a'$ having traveled a greater distance than $b'$ by virtue of its greater phase velocity. For convenience element 14 is shown alone in space, but it should be understood that the waves are conducted into and out of the section by suitable means, such as the adjoining wave guides 12 and 11 already described with reference to Fig. 1. As pointed out above, the properties of element 14 are adjusted so that the differential phase shift will be 90 degrees. Thus, vector $a'$ precedes $b'$ by one-quarter wavelength. It should be noted that this phase differential bears no direct relation to the absolute phase relay, which is not of concern at this point, but is the difference between the absolute phase delays of the two wave components.

Now examine the properties of the emerging wave as seen at some particular cross section to the right of element 14. First the wave will appear to have an instantaneous electric vector $a'$ which points upward and to the left. Ninety degrees later in time the field pattern will have moved forward by one-quarter wavelength, and the electric vector $b'$ will point upward and to the right. One hundred and eighty degrees later the vector will point downward and to the right. Two hundred and seventy degrees later the vector will point downward and to the left. Thus these two emerging waves form a circularly polarized wave which rotates clockwise looking in the direction of propagation. Similarly, the two in-phase waves entering at the left, when added together vectorially, may be considered to form a linearly polarized wave at an angle of 45 degrees to axes A and B. Or, conversely, the two waves $a$ and $b$ are components of a linearly polarized wave oriented at 45 degrees between the axes A and B. Thus, it is demonstrated that a 90-degree differential phase section has the property of converting a linearly polarized wave into a circularly polarized wave when the input is oriented at 45 degrees to the principal axes A and B.

Consider now what happens if a circularly polarized wave is sent into a 90-degree section by sending a clockwise-rotating circularly polarized wave into element 14 from the right. The first two voltage maxima are indicated on Fig. 2 by the vectors at the right as $b'$ and $a'$. Again, the $a'$ component travels more rapidly than the $b'$ component and catches up with it as shown by vector $a$ and vector $b$ at the left. Vectors $a$ and $b$ when added together now form a linearly polarized wave at an angle of 45 degrees counterclockwise from axis A. Similarly, if a counterclockwise-rotating wave is sent into the section from the right, the emerging wave will be linearly polarized at an angle of 45 degrees clockwise from axis A.

Directing attention, now, to element 15, it is interposed between plane-to-circular converters 14 and 16 and is a means of the type which produces an antireciprocal rotation of the plane of polarization of electromagnetic waves, for example, a Faraday-effect element having such properties that an incident wave impressed upon a first side of the element emerges on the second side polarized at a different angle from the original wave and an incident wave impressed on the second side emerges upon the first side with an additional rotation of the same angle. Thus, the polarization of a wave passing through the element first in one direction and then in the other undergoes two successive space rotations or space phase shifts in the same sense, thereby doubling the rotation undergone in a single passage. As illustrated by way of example in the drawing, this means comprises a Faraday-effect element 15 mounted inside guide 11 between elements 14 and 16. As a specific embodiment, as above mentioned, element 15 may be a block of magnetic material, for example nickel-zinc ferrite prepared in the manner disclosed in the copending application of C. L. Hogan. This material has been found to operate satisfactorily as a directionally selective Faraday-effect rotator for polarized electromagnetic waves when placed in the presence of a longitudinal magnetizing field of strength which is readily produced in practice and in such thickness is capable of transmitting electromagnetic waves, for example in the centimeter range, with substantially negligible attenuations. Suitable means for producing the necessary longitudinal magnetic field surrounds element 15 which means may be, as mentioned above, a solenoid 19 mounted upon the outside of guide 11 and supplied by a variable energizing current from source 20 taken by way of potentiometer 21. The angle of rotation of polarized electromagnetic waves in such magnetic material is approximately directly proportional to the thickness of the material traversed by the waves and to the intensity of the magnetization to which the material is subjected, whereby it is possible to adjust the amount of rotation by varying or properly choosing the thickness of the material comprising element 15 and the strength of magnetization supplied by solenoid 19 by adjustment of potentiometer 21.

In operation of the phase shifter of Fig. 1, a vertical linearly polarized wave applied by guide 12 is converted to a clockwise rotating circularly polarized wave by element 14 in the manner already described. This wave then passes through element 15, from which it emerges still circularly polarized and is applied to element 16. The plane of phase shift of element 16 being 45 degrees counterclockwise from the vertical and the applied circularly polarized wave being clockwise, the emergent linear wave will be polarized 45 degrees counterclockwise from the plane of phase shift of element 16 or 90 degrees from the vertical as explained above in detail with reference to Fig. 2. This horizontally polarized wave is then supported in wave guide 13 which is appropriately oriented with its short side horizontal. If no magnetic field is applied to element 15 by solenoid 19, no additional phase shift other than the normal phase shift due to the length of the section, will be introduced to the wave. As the magnetic field is applied, element 15 rotates the instantaneous polarization of the energy applied to element 16 by an angle dependent upon the strength of the field. Since the time phase of energy leaving element 16 and in guide 13 depends, as seen hereinbefore, upon the instantaneous orientation of this energy at the input of element 16, the time phase of energy in guide 13 is shifted by an amount equal to the angle of rotation introduced by element 15. Thus, by varying the direction and strength of the longitudinal magnetic field applied to element 15, the phase of the output energy is controlled. This time phase shift is in a leading sense if the rotation introduced by element 15 is in the same direction as the rotation of the circularly polarized waves applied to element 15 or is in a lagging sense if the respective rotations are opposite. Since elements 14 and 16 produce circularly polarized waves rotating in a given direction dependent upon the direction of propagation therethrough, while element 15 always introduces rotation in a given direction in space regardless of the direction of propagation, the sense of phase shift is reversed by reversing the direction of propagation through the combination.

In Fig. 3, an example of an alternative form of non-reciprocal, variable phase shifter to that of Fig. 1 is represented for purposes of illustration. It may be seen that structurally the phase shifter of Fig. 3 is similar in many respects to the phase shifter of Fig. 1 and corresponding reference numerals have therefore been employed to designate similar components. The difference is seen to reside in the orientations of the permanent magnet 22 and rectangular wave guide 23. Permanent magnet 22 may be noted to have its magnetic field, and therefore the plane of phase shift of element 16, oriented perpendicularly to that of permanent magnet 17; in Fig. 1 the planes of phase shift of converter elements 14 and 16 were parallel. Viewed from the left, the plane of phase shift of converter 14 is oriented 45 degrees counterclockwise from the vertical while that of converter 16 is 45 degrees clockwise from the vertical. A vertical linearly polarized wave entering converter 14 from wave guide 12 will be converted to a clockwise circularly polarized wave and will thus be advanced in phase in its propagation through element 15 and will remain circularly polarized in a clockwise direction. The action of element 16 is to reconvert this circular wave into a linear polarization. As previously explained, with respect to Fig. 2, the resulting linear polarization will be oriented 45 degrees counterclockwise to the plane of phase shift of element 16. As a consequence, the wave emergent from element 16 is vertically polarized and will therefore be supported by wave guide 23 since the short side of the guide is vertical (the short side of its counterpart in Fig. 1, guide 13, is horizontal). If this wave were reflected back through the system it would enter element 15 with a clockwise circular polarization due to the action of converter 16. As a consequence, a phase lag would result from its passage through element 15 since the longitudinal field through element 15 is of opposite polarity with respect to the direction of propagation of the wave from what it was with respect to the wave's initial passage in the reverse direction. Thus a wave making a round-trip through the system would end up with the same phase as it started except for any time phase difference.

The non-reciprocity of this embodiment of the phase shifter is particularly attractive since, even though it exists, both the input and output waves are always linearly polarized in the same direction, namely, vertical, regardless of the direction of propagation of the wave.

In each of Figs. 1 and 3, the gyromagnetic elements therein have been illustrated by way of specific example, as cylindrical blocks of material substantially filling the interior space of the metallic shield wave guide. It should be noted, however, that the effect of the gyromagnetic material on electromagnetic waves continues if the material fills only a portion of this space. Furthermore, in order to prevent or cut down reflections from the faces of the elements, it may be found desirable to employ conical or otherwise tapered transition members, which members may be of dielectric material or of gyromagnetic material on one or both sides of the elements in accordance with usual practice.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. A variable phase shift apparatus for the transmission of electromagnetic wave energy comprising in combination, a source of linearly polarized electromagnetic wave energy, an input means coupled to said source for converting said linearly polarized wave energy from said source to circularly polarized wave energy, an output means for reconverting said circularly polarized wave energy to linearly polarized wave energy, an element of gyromagnetic material interposed between said input and output means in the path of said circularly polarized wave energy, said gyromagnetic material having an inherent level of magnetic saturation, means for applying a magnetic biasing field to said gyromagnetic element in a direction parallel to the direction of propagation of said circularly polarized wave energy, and means for making said magnetic biasing field of variable strength in the range from zero field to a level sufficient to magnetically saturate said gyromagnetic element, said range falling completely outside the region of gyromagnetic resonance for said element at a frequency within the operating range of said apparatus.

2. A variable phase shift apparatus for the transmission of electromagnetic wave energy comprising, a source of linearly polarized electromagnetic wave energy, a first 90-degree differential phase shift means on the input side coupled to said source for converting said linearly polarized wave energy from said source to circularly polarized wave energy, said first differential phase shift means selectively providing a unique value of phase velocity to components of said linear wave energy polarized solely in a unique plane, said unique plane of said first means having a 45-degree angular orientation in a first given sense relative to the plane of polarization of said linear wave energy from said source as viewed from said input side, a second 90-degree differential phase shift means on the output side for reconverting said circularly polarized wave energy to linear wave energy polarized in a given desired plane, said second differential phase shift means selectively providing a unique value of phase velocity to linear wave energy components polarized solely in a unique plane, said unique plane of said second means having a 45-degree angular orientation in the same sense as said first given sense relative to said desired plane of polarization of said reconverted linear wave as viewed from said output side, an element of gyromagnetic material interposed between said first and said second means in the path of said circularly polarized wave energy, said gyromagnetic material having an inherent level of magnetic saturation, means for applying a magnetic biasing field to said gyromagnetic element in a direction parallel to the direction of propagation of said circularly polarized wave energy, and means for making said magnetic biasing field of variable strength in the range from zero field to a level sufficient to magnetically saturate said gyromagnetic element, said range falling completely outside the region of gyromagnetic resonance for said element at a frequency within the operating range of said apparatus.

References Cited in the file of this patent
UNITED STATES PATENTS 2,607,849    Purcell _____ Aug. 19, 1952

OTHER REFERENCES

Sakiotis et al.: "Microwave Ferrite Applications," Electronics, June 1952, pages 156, 158, 162 and 166.

Hogan: "Faraday Effect at Microwave Frequencies," Bell Technical Journal, vol. 31, January 1952, pages 1–31.